United States Patent [19]
Barrett

[11] Patent Number: 4,740,984
[45] Date of Patent: Apr. 26, 1988

[54] MAGNETICALLY INDUCED LASER

[75] Inventor: Terence W. Barrett, Bethesda, Md.

[73] Assignee: The United States of America as represented by the Secretary of the Navy, Washington, D.C.

[21] Appl. No.: 474,607

[22] Filed: Mar. 11, 1983

[51] Int. Cl.⁴ .................... H01S 3/091; H01S 3/092
[52] U.S. Cl. ........................................ 372/70; 372/71
[58] Field of Search ................................. 372/70, 71

[56] References Cited

U.S. PATENT DOCUMENTS

| | | | |
|---|---|---|---|
| 3,234,475 | 2/1966 | Giordmaine et al. | 330/4.6 |
| 3,788,635 | 12/1973 | Giuliani | 307/88.3 |
| 3,922,560 | 11/1975 | Wolff | 307/88.3 |
| 3,947,688 | 3/1976 | Massey | 250/495 |
| 4,103,179 | 7/1978 | Schmidt | 372/70 |
| 4,264,877 | 4/1981 | Grischkowsky et al. | 372/70 |

Primary Examiner—William L. Sikes
Assistant Examiner—Robert E. Wise
Attorney, Agent, or Firm—Thomas E. McDonnell; Charles E. Krueger

[57] ABSTRACT

A laser for generating a coherent output beam with a frequency equal to the sum or difference of the frequencies of two input pumping beams or the harmonics thereof. The laser includes a lasing medium of the type with an inverse Faraday effect resonance frequency $f_1$, a laser cavity with the lasing medium positioned therein, two coherent light sources for generating pumping beams at frequency $f_1$ and $f_2$, where the $f_1$ beam is circularly polarized, and an optical system for directing the pumping beams into the lasing medium.

23 Claims, 1 Drawing Sheet

MAGNETICALLY INDUCED LASER

BACKGROUND OF THE INVENTION

The invention relates generally to lasers and more particularly to lasers for generating a beam with its frequency equal to the sum of the frequencies of two pumping beams.

The development of pulsed lasers has provided beams with peak powers in the megawatt to gigawatt range. These beams have been used to study the non-linear response of molecules to high optical fields. Recently, much interest has centered on using these interactions to design parametric lasers that generate coherent beams at harmonic and sum and difference frequencies. However, these parametric lasers have met with limited success due to the dependence of non-linear interaction on the third order susceptibility term $\chi^{(3)}$. Since this term is generally small, the non-linear reaction has a very high threshold thereby requiring pumping beams of high power.

OBJECTS OF THE INVENTION

Accordingly, it is an object of the present invention to provide a parametric laser that does not require high-power pumping beams.

It is a further object of the invention to generate an laser interaction which depends on the second order susceptibility $\chi^{(2)}$ where $\chi^{(2)} << \chi^{(3)}$.

SUMMARY OF THE INVENTION

The above and other objects are achieved in the present invention which includes a lasing medium with an inverse Faraday effect resonance frequency $f_1$ positioned within a laser cavity, two pumping lasers for producing beams at $f_1$ and $f_2$, where the $f_1$ beam is circularly polarized, and an optical system for directing the pumping beams onto the lasing medium at a crossing angle $\alpha$. The circularly polarized component of the $f_1$ beam acts as an effective magnetic field.

The medium may be any fluorescing medium with d electrons split in zero magnetic field. Examples include an organic molecule including a transition metal or rare earth ion surrounded by a ring-like organic structure or a crystal such as yttrium iron garnet or garnet. The medium mediates a three-wave mixing process wherein two input coherent pumping beams at $f_1$ and $f_2$ are mixed to produce a coherent output beam at $f_3 = f_1 + f_2$ or harmonics of $f_1$ and $f_2$.

The efficiency of the mixing process is dependent on the second order susceptibility $\chi^{(2)}$ of the lasing medium instead of the much smaller third order susceptibility $\chi^{(3)}$ as in existing devices. Thus, the present invention does not require the high power pumping beams of existing parametric lasers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF A PREFERRED EMBODIMENT

The present invention utilizes a unique lasing medium that mediates a three-wave mixing process to produce an output beam with a frequency equal to the sum or difference of the frequencies of two pumping beams or the harmonics thereof. The dynamics of the three-wave sum mixing process are described below in reference to FIG. 1. The structure of a preferred embodiment is set forth in FIG. 2.

Figure 1:
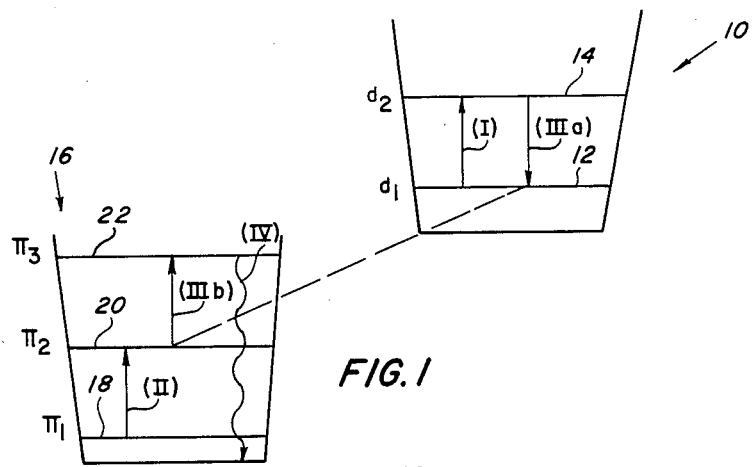
FIG. 1 is a graphical depiction of the energy levels and transitions involved in a three-wave mixing process.

Referring now to the drawings, wherein like reference numerals designate identical or corresponding parts throughout the several views, and more particularly to FIG. 1 thereof, an energy level diagram illustrating the three-wave sum mixing process is set forth. The lasing medium includes a transition metal or rare earth ion surrounded by a ring-like organic structure. The charge circulation in the ring-like structure creates a zero order magnetic field which splits the energy levels of d electron states of the ion into two components. The first energy level diagram 10 of the ionic states depicts these split d levels $d_1$ and $d_2$ 12 and 14. A circularly polarized first pumping beam at frequency $f_1$ induces transitions from $d_1$ to $d_2$. Since the d states are split by the zero order magnetic field these transitions will be magnetic dipole induced. Generally the magnetic dipole transition rate is low, but for a circularly polarized beam tuned to $f_1 = \Delta E_1/h$, where $\Delta E_1$ is the energy gap between $d_1$ and $d_2$ and h is Planck's constant, the transition rate is high. The absorbtion of photons from a circularly polarized $f_1$ beam is the inverse Faraday effect. Since the transition rate between $d_1$ and $d_2$ is small unless $f_1 = \Delta E_1/h$ the value of $\Delta E_1$ must be measured so that $f_1$ can be tuned to resonance.

The energy gap between these split d levels, $\Delta E_1$, may be measured by utilizing a normal Faraday effect (NFE) measurement or a magnetic circular dichroism (MCD) measurement. Briefly, the NFE measurement includes the steps of directing a frequency scanned linearly polarized beam into the lasing medium which is in an external magnetic field, and measuring the frequency at which maximum rotation of the incident beam occurs (cf. Volkenstein, *Molecular Biophysics*, Academic Press, New York, 1977). The MCD measurement includes the steps of directing a frequency scanned circularly polarized beam into the lasing medium and measuring left versus right circularly polarized incident light absorption differences (cf. Hollebone, B. R. and Stillman, M. J., J. Chem. Soc. Faraday Trans. II 74(1978)2107). The frequency resonance obtained from either the NFE or MCD measurement occurs at the same frequency as frequency resonance for the inverse Faraday effect (IFE), which is effected in the present embodiment by the circularly polarized $f_1$ beam. The resonances in the three effects: NFE, MCD and IFE are all dependent upon the magnitude of the medium's frequency dependent Verdet constant. Inverse Faraday effect resonance frequencies for selected media are set forth below.

A second energy level diagram 16 depicts the energy states of the ring like organic structure. Three states, $\pi_1$, $\pi_2$ and $\pi_3$, 18, 20 and 22, are depicted. The energy difference between $\pi_2$ 20 and $\pi_1$ 18 is $\Delta E_2$ and the energy difference between $\pi_3$ 22 and $\pi_1$ 18 is $\Delta E_3$. The ring-like structure must fluoresce when excited into the $\pi_3$ state which requires that the transition $\pi_3 \rightarrow \pi_1$ be an electric dipole transition.

Exemplary lasing media exhibiting the above-described characteristics include the porphyrins, e.g. hemoglobin, cytochrome, the phthalocyanines or any other fluorescing medium with d electrons split in zero field.

The mechanics of three-wave mixing will now be described. The lasing medium is simultaneously irradiated with two coherent pumping beams. The first circularly polarized pumping beam at frequency $f_1 = \Delta E_1/h$, induces a magnetic dipole transition from the state $d_1$ to $d_2$ (I). The second pumping beam, at frequency $f_2 = \Delta E_2/h$, induces an electric dipole transition from $\pi_1$ to $\pi_2$ (II). Next an electronic charge transfer interaction transfers the energy, $\Delta E_1$, from the $d_2 \rightarrow d_1$ interaction (III$_a$) to a $\pi_2 \rightarrow \pi_3$ interaction (III$_b$). For example, charge transfer interaction coupling between metal electron orbitals and porphyrin $\pi^*$ orbitals has been demonstrated (J. A. Shelnutt et al. Proc. Nat. Acad. Sci. US 76 (1979)4409), and is the basis for the mechanism of spinorbit coupling. Finally, the fluorescent $\pi_3 \rightarrow \pi_1$ transition generates a photon at frequency $f_3 = f_1 + f_2$ (IV).

Figure 2:
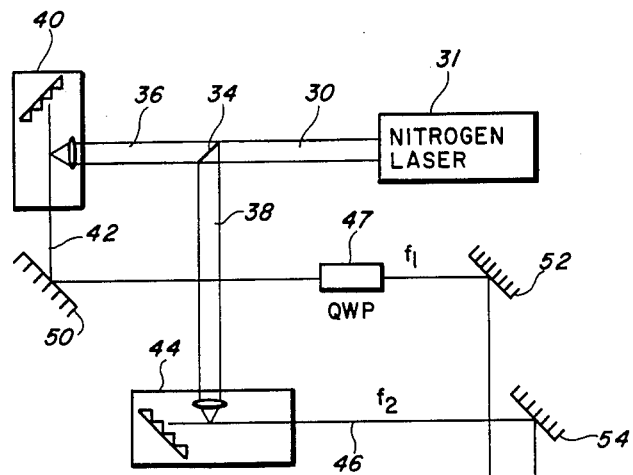
FIG. 2 is a block diagram of a preferred embodiment of the invention.

A diagram of a preferred embodiment of the present invention is set forth in FIG. 2. Referring now to FIG. 2, a first laser beam 30 from a nitrogen laser 31 is split by a beamsplitter 34 into a second beam 36 and a third beam 38. The second beam is directed to a first dye laser 40 that produces a fourth laser beam 42 tuned to $f_1$ while the third output beam 38 is directed to second dye laser 44 that produces a fifth laser beam 46 at frequency $f_2$. The beam 42 is passed through a quarter wave plate (QWP) 47 becoming circularly polarized. The fourth and fifth laser beams 42 and 46 are directed to a lense 48 by mirrors 50, 52, 54. This lense 48 directs the fourth and fifth beams 42 and 46 into a lasing cavity 56 containing the lasing medium 60 at crossing angle $\alpha$. A sixth laser beam 62 at frequency $f_3$ is generated inside the lasing cavity where $f_3 = f_1 + f_2$. The beams are oriented with crossing angle $\alpha$ because the laser interaction depends on the second order magnetic susceptibility $\chi^{(2)}$. Since $\chi^{(2)}$ is a tensor the pumping beams must be spatially oriented with a crossing angle $\alpha$. For the media utilized in the invention $\alpha < 3°$.

The inverse Faraday resonance wavelengths $(\lambda_1)$ and corresponding equivalent energies $(\Delta E_1)$ obtained from NFE and MCD measurements are set forth below for exemplary lasing media:

| Medium | $f_1(\text{Å})$ | $\Delta E_1(ev)$ |
|---|---|---|
| [1]hemoglobin | 5800 | 2.14 |
| [1]cytochrome | 5500 | 2.25 |
| [2]$\alpha$-CoPc | 6181 | 2.01 |
| ($\alpha$ - cobalt phthalocyanine) | | |
| [2]$\alpha$NiPc | 6109 | 2.03 |
| ($\alpha$ - nickel phthalocyanine) | | |
| [2]$\alpha$CuPc | 6181 | 2.01 |
| ($\alpha$ - copper phthalocyanine) | | |

[1]Volkenstein, Molecular Biophysics, NFE data.
[2]Helletone, B. R. and Stillman, M. J. (1978) J. Chem Soc. Faraday Trans. II 74, 2107 (Table 1, page 2117, MCD data).
Note that $f_1 = c/\lambda$, or $\Delta E_1/h$.

Thus, in practice, the first dye laser would be tuned so that $f_1$ corresponds to the known inverse Faraday effect resonance of the lasing media and the $f_1$ output beam is circularly polarized. The second dye laser would be scanned to vary $f_2$ over a predetermined range of visible frequencies. Three-wave mixing would take place when the dynamic conditions described above are satisfied for the lasing medium employed.

The invention could be used to detect the presence of a given lasing medium due to the selectivity of the three-wave mixing process. For example, given a predetermined $f_2$, an output beam at $f_3 = f_1 + f_2$ would be generated only if a lasing medium with IFE resonance frequency $f_1$ were present in the lasing cavity.

Figure 3:
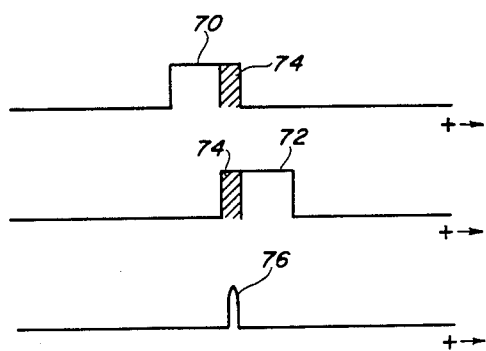
FIG. 3 is a graph depicting the input and output light pulses as a function of time.

Additionally, the device could be utilized to generate pulses of ultra-short duration. This application is illustrated in FIG. 3, a graph depicting three pulses as a function of time. A first circularly polarized input pulse of coherent light 70 at frequency $f_1$ and a second input pulse 72 at frequency $f_2$ are directed into the lasing medium. Note that the time of overlap 74 between the pulses is less than the width of either pulse. The three-wave mixing process only takes place in the presence of both pulses, i.e., during the overlap 74. Thus, the coherent sum beam at $f_3$ will only be generated during the overlap period and will be in the form of an output pulse 76 of shorter duration than either input pulse.

The pumping beam sources need not be dye lasers. Alternative sources could include crystal doublers driven by a laser beam. The particular source arrangement would depend on the frequencies, $f_1$ and $f_2$, of the pumping beams. These sources are described in an article by J. W. Nibler et. al entitled "Coherent Anti-Stokes Raman Spectroscopy" included in *Raman Spectroscopy of Gases and Liquids*, Springer-Verlag, Berlin, 1979 (Weber, Ed.) Ch. 7.

In addition to the lasing media described above yttrium iron garnet and garnet are also suitable laser media. For these media the zero order field is generated by atoms in the crystal lattice. As research progresses, other lasing media satisfying the criteria set forth herein will be discovered. It whould be obvious to a person skilled in the art and apprised of the teachings of this application to utilize these media in the invention.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A magnetically induced laser comprising:
    a lasing medium with an inverse Faraday effect resonance frequency $f_1$;
    a laser cavity with said lasing medium positioned therein;
    a first source for producing a first coherent pumping beam at frequency $f_1$;
    a second source for producing a second coherent pumping beam at frequency $f_2$,
    means for circularly polarizing said first beam; and
    optical means for directing said pumping beams into said lasing medium and for orienting said beams so that their crossing angle is $\alpha$.

2. The magnetically induced laser recited in claim 1 wherein:
    said lasing medium is a transition metal compound with a ring-like organic structure.

3. The magnetically induced laser recited in claim 1 wherein:
    said lasing medium is a rare earth compound surrounded by a ring-like organic structure.

4. The magnetically induced laser recited in claim 1 wherein:
said lasing medium is fluorescent and has d electrons split in zero field.

5. The magnetically induces laser recited in claim 4 wherein:
$\alpha$ is less that about 3°.

6. The magnetically induced laser recited in claim 1 wherein:
said lasing medium is hemoglobin with $\lambda_1 = c/f_1 \approx 5800$ Å.

7. The magnetically induced laser recited in claim 1 wherein:
said lasing medium is a pthalocyanine with $\lambda_1 = c/f_1 \approx 6200$ Å.

8. The magnetically induced laser recited in claim 1 wherein:
said lasing medium is yttrium iron garnet.

9. The magnetically induced laser recited in claim 1 wherein:
said lasing medium is cytochrome with $\lambda_1 = c/f_1 \approx 5500$ Å.

10. The magnetically induced laser recited claim 1 wherein:
said second source includes means for scanning $f_1$ over a predetermined range.

11. The magnetically induced laser recited in claim 1 wherein:
said first source is a first dye laser and said second source is a second dye laser.

12. A magnetically induced laser comprising:
a lasing medium with an inverse Faraday effect resonance $f_1$;
a laser cavity with said lasing medium positioned therein;
a first dye laser for producing a first pumping beam at frequency $f_1$;
a second dye laser for producing a second pumping beam at $f_2$;
a circular polarizer positioned in said first pumping beam; and
a plurality of mirrors and lenses, positioned between said dye lasers and said laser cavity, for directing said pumping beams into said lasing medium at a crossing angle of less than about 3°.

13. The magnetically induced laser recited in claim 12 wherein:
said lasing medium is a transition metal compound with a ring-like organic structure.

14. The magnetically induced laser recited in claim 12 wherein:
said lasing medium is a rare earth compound surrounded by a ring-like organic structure.

15. The magnetically induced laser recited in claim 12 wherein:
said lasing medium is fluorescent with d electrons split in zero field.

16. The magnetically induced laser recited in claim 12 wherein:
said lasing medium is hemoglobin with $\lambda_1 = c/f_1 \approx 5800$ Å

17. The magnetically induced laser recited in claim 12 wherein:
said lasing medium is a pthalocyanine with $_1 = c/f_1 \approx 6200$ Å.

18. The magnetically induced laser recited in claim 12 wherein:
said lasing medium is yttrium iron garnet.

19. The magnetically induced laser recited in claim 12 wherein:
said lasing medium is cytochrome with $_1 = c/f_1 \approx 5500$ Å

20. The magnetically induced laser recited claim 12 wherein:
said second dye laser includes means for scanning $f_2$ over a predetermined range.

21. A method for producing a laser beam comprising:
selecting a laser medium with an inverse Faraday effect resonance frequency $f_1$;
positioning said medium in a laser cavity;
tuning a first coherent light source to produce a first output beam at $f_1$;
tuning a second coherent light source to produce a second output beam at $f_2$, where $f_2$ is a visible light frequency;
circularly polarizing said first output beam; and
directing said output beams into said lasing medium at a crossing angle $\alpha$.

22. The method recited in claim 21 wherein:
said step of directing said output beams includes the step of adjusting $\alpha$ to be less than or equal to about 3°.

23. The method recited in claim 22 wherein:
said step of tuning said second coherent light source includes the step of scanning $f_2$ over a predetermined range.

* * * * *